United States Patent
Hanaoka

(10) Patent No.: US 12,045,030 B2
(45) Date of Patent: Jul. 23, 2024

(54) CONTROLLER AND EXTRAPOLATION METHOD OF COMMAND VALUE

(71) Applicant: NIDEC SANKYO CORPORATION, Nagano (JP)

(72) Inventor: Masashi Hanaoka, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 194 days.

(21) Appl. No.: 17/863,392

(22) Filed: Jul. 13, 2022

(65) Prior Publication Data

US 2023/0024548 A1 Jan. 26, 2023

(30) Foreign Application Priority Data

Jul. 20, 2021 (JP) .................................. 2021-119735

(51) Int. Cl.
G05B 11/01 (2006.01)
G05B 19/19 (2006.01)

(52) U.S. Cl.
CPC .... *G05B 19/19* (2013.01); *G05B 2219/34099* (2013.01); *G05B 2219/42062* (2013.01)

(58) Field of Classification Search
CPC ...................................................... G05B 19/19
USPC ......................................................... 318/560
See application file for complete search history.

(56) References Cited

U.S. PATENT DOCUMENTS

| 5,132,854 A | * | 7/1992 | Tsuyoshi ............. G11B 5/5547 |
| | | | 360/78.04 |
| 5,309,075 A | * | 5/1994 | Yokoe ...................... H02P 21/22 |
| | | | 318/632 |

FOREIGN PATENT DOCUMENTS

| JP | S63280307 A | 11/1988 |
| JP | 2009134380 A | 6/2019 |

* cited by examiner

*Primary Examiner* — Erick D Glass
(74) *Attorney, Agent, or Firm* — HAUPTMAN HAM, LLP

(57) ABSTRACT

A controller which controls an apparatus having motors each of which drives each axis includes a control part which is provided so as to correspond to a motor for each axis and servo-controls the motor based on a command value applied to the motor. The control part receives the command value from a host apparatus and updates the command value in a predetermined updating period. When the command value in a "t"-th updating period used in the control part is defined as y(t), the control part includes an extrapolation calculation part which calculates a command value y(k) used in a "k"-th updating period according to the following expression when the control part has not received the command value from the host apparatus or abnormality occurs in the communication in the "k"-th updating period:

$y(k)=y(k-2)+\{y(k-1)-y(k-3)\}$, or $y(k)=y(k-2)+\{y(k-2)-y(k-4)\}$.

12 Claims, 11 Drawing Sheets

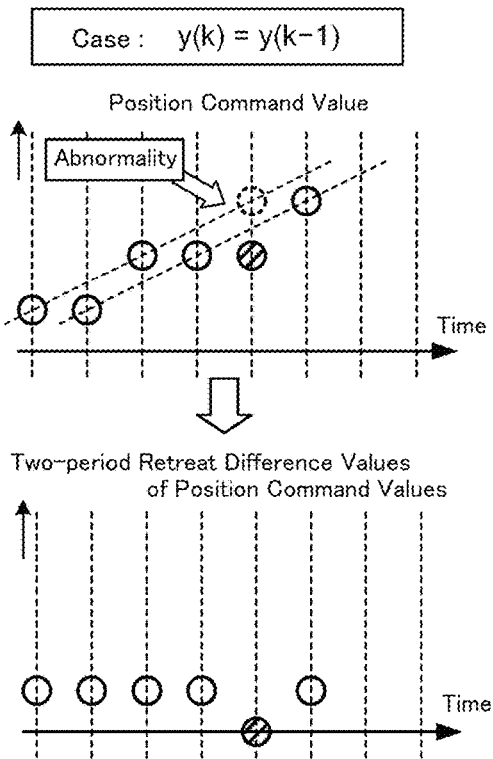
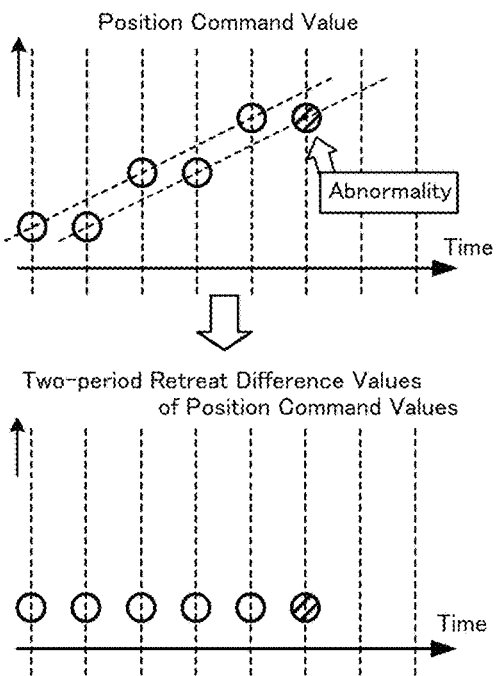
FIG. 7A  FIG. 7B
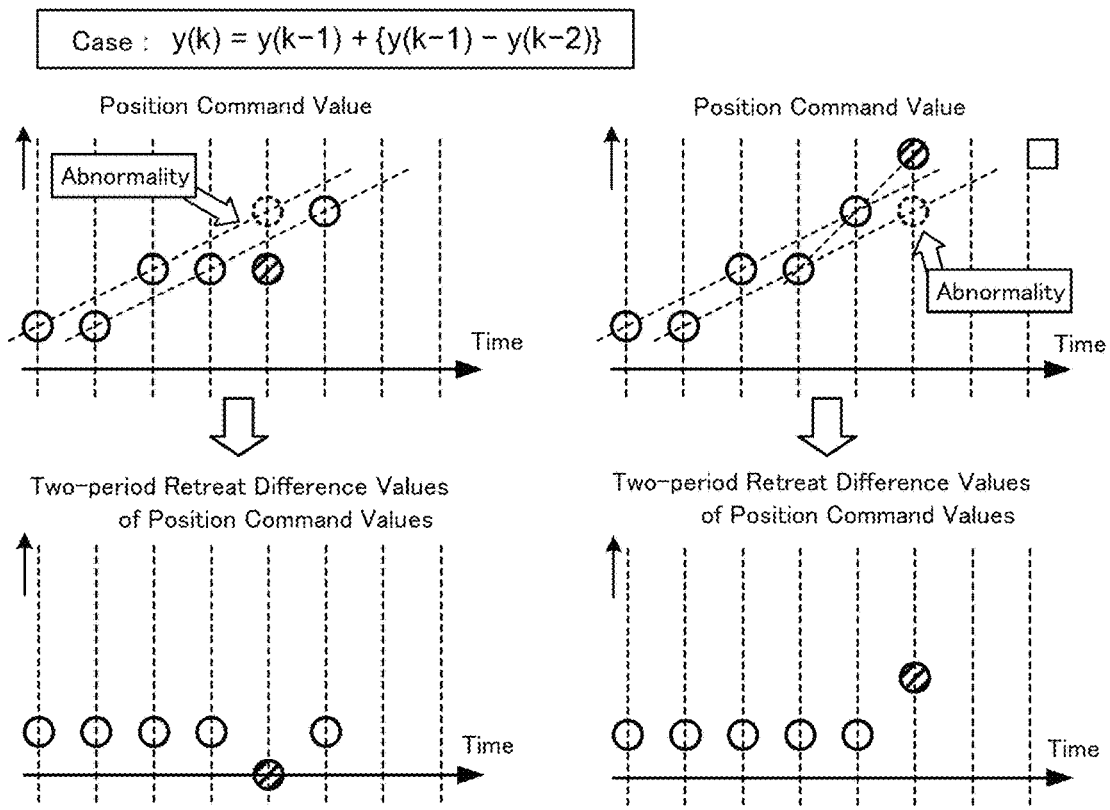
FIG. 8A  FIG. 8B

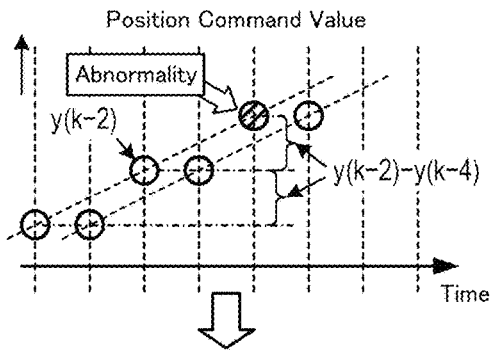
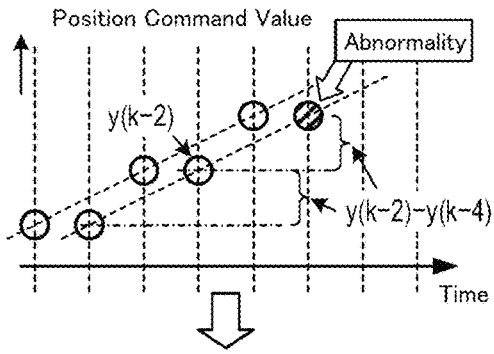
FIG. 9A  FIG. 9B
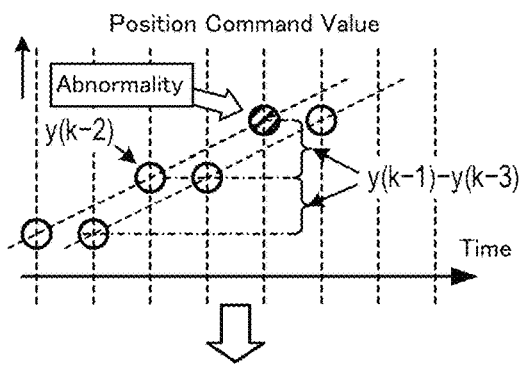
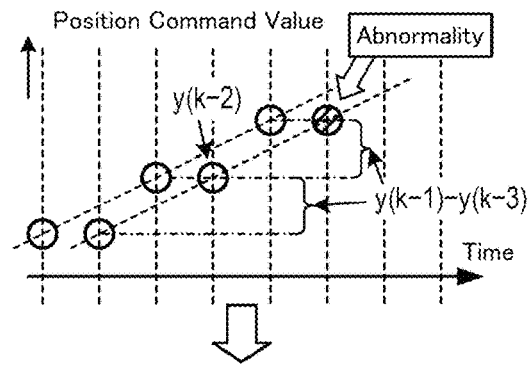
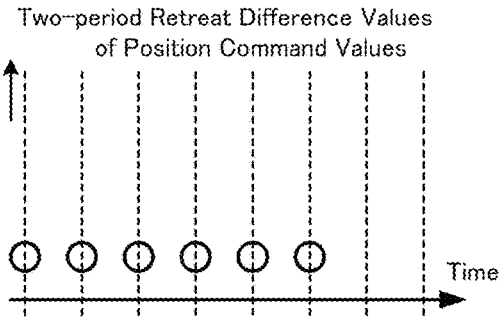
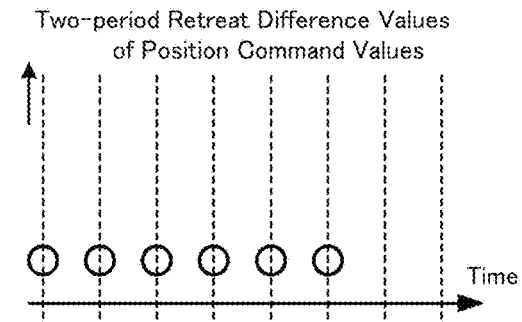
FIG. 10A  FIG. 10B

CONTROLLER AND EXTRAPOLATION METHOD OF COMMAND VALUE

CROSS REFERENCE TO RELATED APPLICATION

The present invention claims priority under 35 U.S.C. § 119 to Japanese Application No. 2021-119735 filed Jul. 20, 2021, the entire content of which is incorporated herein by reference.

TECHNICAL FIELD

At least an embodiment of the present invention may relate to a controller which controls an apparatus having motors each of which drives each axis, and especially relate to a extrapolation method of a command value in the controller.

BACKGROUND

As an apparatus which includes motors each of which drives each axis, for example, a robot and various conveyance apparatuses have been known. A controller which controls such an apparatus is, for example, referred to as a robot controller or a motion controller, and the controller includes position control parts each of which is provided so as to correspond to each motor and control the motor based on a position command value applied to the motor. As an example of such a controller, a robot controller will be described below. In order to operate a robot along a specified trajectory, a plurality of axes provided in the robot is required to move simultaneously. Therefore, a robot controller is also provided with a plural axes position command creation part which collectively calculates and outputs position command values for a plurality of axes of the robot (for example, all axes of the robot). The plural axes position command creation part functions as a host device with respect to the position control parts and thus, the plural axes position command creation part may be provided so as to be separated from the robot controller which is provided with the position control parts for respective axes. The plural axes position command creation part and the position control parts are connected with each other through signal lines or a communication network.

The position control part receives a position command value for its corresponding axis from the plural axes position command creation part in a constant period, for example, of a hundred μs through several hundreds μs to servo-control the motor of the corresponding axis based on the received position command value. In this case, depending on limitation such as a processing load in the plural axes position command creation part and a bandwidth of the communication network, a transmission interval of the position command value from the plural axes position command creation part to the position command part may become longer than an update period (also referred to as a sampling period) of the position command value in the position control part. In such a case, it is required that interpolation calculation is performed in the position control part based on the received position command value to create a position command for servo-control. Further, there is a case that the position control part is unable to receive a position command value due to communication abnormality and, in this case, extrapolation calculation of the position command value is required to perform based on the position command value having already received. When the position command value obtained by the interpolation calculation and the extrapolation calculation is not an appropriate value, a movement of the robot is not smooth and abnormal noise and vibration may occur in the robot. Even in a case that a motor is servo-controlled by a speed command value instead of a position command value, interpolation calculation and extrapolation calculation of a speed command value is similarly required to perform.

As an example of extrapolation calculation of a position command value in a robot controller, Japanese Patent Laid-Open No. 2009-134380 (Patent Literature 1) discloses that a position command value by extrapolation calculation is delayed by a predetermined update period and, in a case that a difference value of position command values by extrapolation calculation in the last update period and the current update period is larger than a difference value in a position command value received from a host apparatus, the position command value is further corrected by extrapolation calculation. Further, Japanese Patent Laid-Open No. Shou 63-280307 (Patent Literature 2) discloses that a position command value received from a host apparatus and its reception time are written in a ring buffer, and a position command value at the present time is calculated by extrapolation calculation based on the position command value and the reception time which have been written in the ring buffer.

In the method described in Patent Literature 1, when position command parts in which update periods of position command values are different from each other coexist, movement of the robot may become unnatural. Further, the position command value obtained by extrapolation calculation is further corrected and thus, a calculation load is also large. The method described in Patent Literature 2 is performed on the premise that a position command value is always received and thus, in a case that one or more position command values are not received due to communication abnormality, the method is not applied. Such a problem may occur in an apparatus having motors each of which drives its axis other than a robot.

SUMMARY

In view of the problem described above, at least an embodiment of the present invention may advantageously provide a controller in which abnormal noise and vibration do not occur even when a command value transmitted from a host apparatus is not received due to communication abnormality and, in addition, in which a calculation load of extrapolation calculation is small, and provide an extrapolation method of a command value in the controller.

According to at least an embodiment of the present invention, there may be provided a controller which controls an apparatus including motors each of which drives each axis. The controller includes a control part which is provided so as to correspond to a motor for each axis and servo-controls the motor based on a command value applied to the motor. The control part receives the command value from a host apparatus through communication and updates the command value to be used in a predetermined updating period and, in a case that the command value in a "t"-th updating period which is used in the control part is defined as y(t), the control part includes an extrapolation calculation part which calculates a command value y(k) which is used in a "k"-th updating period according to a following expression when the control part has not received the command value from the host apparatus or abnormality occurs in the communication in the "k"-th updating period:

$$y(k)=y(k-2)+\{y(k-1)-y(k-3)\}, \text{ or}$$

$$y(k)=y(k-2)+\{y(k-2)-y(k-4)\}.$$

According to at least another embodiment of the present invention, there may be provided a controller which controls an apparatus comprising motors each of which drives each axis. The controller includes a control part which is provided so as to correspond to a motor for each axis and servo-controls the motor based on a command value applied to the motor. The control part receives the command value from a host apparatus through communication and updates the command value to be used in a predetermined updating period and, when "m" is an integer of two or more, and a transmission period for transmitting the command value by the host apparatus is "m"-times of a period updating the command value by the control part, and the command value in a "t"-th updating period which is used in the control part is defined as y(t), the control part includes an extrapolation calculation part which calculates a command value y(k) which is used in a "k"-th updating period according to a following expression when the control part has not received the command value from the host apparatus or abnormality occurs in the communication in the "k"-th updating period:

$$y(k)=y(k-m)+\{y(k-1)-y(k-m-1)\}.$$

According to the controllers described above in accordance with the present invention, extrapolation calculation is performed according to the following expression:

$$y(k)=y(k-2)+\{y(k-1)-y(k-3)\},$$

$$y(k)=y(k-2)+\{y(k-2)-y(k-4)\}, \text{ or}$$

$$y(k)=y(k-m)+\{y(k-1)-y(k-m-1)\}.$$

As a result, even in a case that a command value is unable to be received from a host apparatus due to communication abnormality or the like, occurrence of abnormal noise and vibration is suppressed and an apparatus having a motor can be smoothly moved. The controller in accordance with the present invention is, for example, a robot controller or a motion controller.

The control part of the controller in accordance with the present invention may include a servo calculation part to which information regarding a position of the motor is fed back from an encoder connected with the motor to perform calculation required to servo-control, and an abnormality detection part which determines whether the command value has been effectively received from the host apparatus or not for each updating period. In this case, the extrapolation calculation part transfers the command value received from the host apparatus to the servo calculation part when the abnormality detection part determines that the command value has been effectively received, and the extrapolation calculation part transfers the command value calculated by the extrapolation calculation part to the servo calculation part when the abnormality detection part does not determine that the command value has been effectively received. When the robot controller is configured as described above, in an updating period where a command value has been received from the host apparatus, servo control is performed based on the received command value and thus, accurate control can be performed for the command value created by the host apparatus.

In the controller in accordance with the present invention, the command value is, for example, a position command value applied to the motor. When a position command value is used as an object in extrapolation calculation, a smooth movement in an apparatus having a motor can be realized.

In the controller in accordance with the present invention, the host apparatus may include a plural axes command creation part which collectively calculates and outputs the command values applied to the motors for a plurality of the axes in the apparatus. In a case that a command value is unable to be transmitted from the host apparatus so as to match an updating period of a command value in the control part due to processing ability or the like in the plural axis command creation part, even if communication abnormality occurs, according to the present invention, an apparatus having a motor can be moved smoothly.

According to at least an embodiment of the present invention, there may be provided an extrapolation method in a controller which receives a command value applied to a motor for each axis from a host apparatus and updates the command value to be used in a predetermined updating period to servo-control the motor based on the command value. The extrapolation method includes, when the command value in a "t"-th updating period which is used for servo-control is defined as y(t), calculating a command value y(k) which is used in a "k"-th updating period according to a following expression when the command value from the host apparatus is not received or abnormality occurs in the communication in the "k"-th updating period:

$$y(k)=y(k-2)+\{y(k-1)-y(k-3)\}, \text{ or}$$

$$y(k)=y(k-2)+\{y(k-2)-y(k-4)\}.$$

According to at least another embodiment of the present invention, there may be provided an extrapolation method in a controller which receives a command value applied to a motor for each axis from a host apparatus and updates the command value to be used in a predetermined updating period to servo-control the motor based on the command value. The extrapolation method includes, when "m" is an integer of two or more, and a transmission period for transmitting the command value by the host apparatus is "m"-times of the updating period, and the command value in a "t"-th updating period which is used in the control part is defined as y(t), calculating a command value y(k) which is used in a "k"-th updating period according to a following expression when the command value from the host apparatus is not received or abnormality occurs in the communication in the "k"-th updating period:

$$y(k)=y(k-m)+\{y(k-1)-y(k-m-1)\}$$

According to the extrapolation methods in accordance with the present invention, extrapolation calculation is performed according to the following expression:

$$y(k)=y(k-2)+\{y(k-1)-y(k-3)\},$$

$$y(k)=y(k-2)+\{y(k-2)-y(k-4)\}, \text{ or}$$

$$y(k)=y(k-m)+\{y(k-1)-y(k-m-1)\}.$$

As a result, even in a case that a command value is unable to be received from a host apparatus due to communication abnormality or the like, occurrence of abnormal noise and vibration is suppressed and an apparatus having a motor can be smoothly moved. The controller to which the extrapolation method in accordance with the present invention is applied is, for example, a robot controller or a motion controller.

In the extrapolation method in accordance with the present invention, the command value is, for example, a position command value applied to the motor. When a position command value is used as an object in extrapolation calculation, a smooth movement in an apparatus having a motor can be realized.

Effects of the Invention

According to the present invention, even when a command value transmitted from a host apparatus is not received due to communication abnormality, extrapolation calculation can be performed with a small calculation load without occurring abnormal noise and vibration.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 7A and 7B are views showing examples of an extrapolation method.

FIGS. 8A and 8B are views showing examples of an extrapolation method.

FIGS. 9A and 9B are views showing an extrapolation method in accordance with an embodiment of the present invention.

FIGS. 10A and 10B are views showing other examples of an extrapolation method in accordance with another embodiment of the present invention.

DETAILED DESCRIPTION

Figure 1:
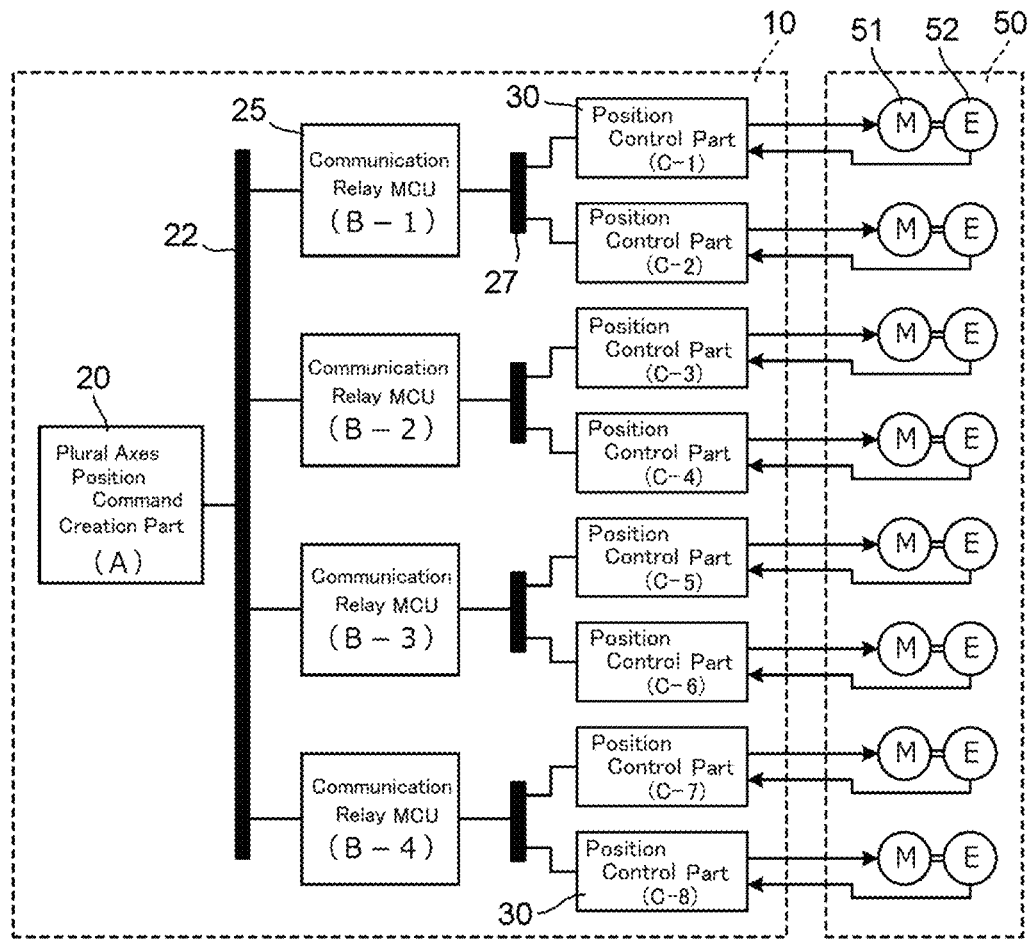
FIG. 1 is a view showing an example of a configuration of a robot controller.

Embodiments in accordance with the present invention will be described below with reference to the accompanying drawings. In the following descriptions, a controller to which the present invention is applied is a robot controller which is used for control of a robot. However, the present invention may be widely applied to a controller which controls an apparatus having motors each of which drives its axis for each axis. As an example, in addition to a robot controller, the present invention may be applied to a motion controller. FIG. 1 is a view showing an example of a configuration of a robot controller to which the present invention is applied. A robot controller 10 shown in FIG. 1 is configured to control a robot 50 having a plurality of axes. The robot 50 includes, for each axis, a motor (M) 51 and an encoder (E) 52 which is connected with the motor 51 to detect a rotation position of the motor 51. In the example shown in FIG. 1, the robot 50 is a robot having eight axes.

The robot controller 10 includes position control parts 30 each of which is provided so as to correspond to each of the motors 51 in an inside of the robot 50 and controls the corresponding motor 51 based on a position command value applied to the motor 51. The robot 50 has eight axes and thus, eight position control parts 30 are provided which are shown as "C-1" through "C-8" in FIG. 1. Further, in order to move the robot 30 along a specified trajectory, a plural axes position command creation part 20 in which position command values for a plurality of the axes provided in the robot 50 are collectively calculated and outputted is also provided in the robot controller 10. The plural axes position command creation part 20 is, for example, configured by using a microprocessor. The robot controller 10 is commonly provided in proximity to the robot 50. However, the plural axes position command creation part 20 may be provided as a host apparatus collectively controlling a plurality of robots 50 at a position separated from a main body of the robot controller 10 having at least the position control parts 30. A large-scale plural axes position command creation part 20 which supervises a plurality of robots 50 is, for example, configured by using a server computer. The plural axes position command creation part 20 corresponds to a plural axes command creation part, and the position control part 30 corresponds to a control part.

The plural axes position command creation part 20 and a plurality of the position control parts 30 are connected with each other through signal lines or a communication network, and position command values are transmitted from the plural axes position command creation part 20 to the respective position control parts 30. In FIG. 1, in order to relay transmission of a position command value from the plural axes position command creation part to the position control part 30, a communication relay MCU (microcontroller unit) 25 is provided. One communication relay MCU 25 is capable of communicating with a maximum of two position control parts 30 and, in this example, eight position control parts 30 are provided and thus, four communication relay MCUs 25 are provided as indicated with "B-1" through "B-4" in FIG. 1. In FIG. 1, the plural axes position command creation part 20 indicated with "A" and four communication relay MCUs 25 are connected with each other through a network 22 which is capable of performing high-speed communication. In the network 22, communication is performed by an open industrial communication network protocol. As an example of a protocol in such the network 22, the EtherCAT (registered trademark) and CC-Link (registered trademark) have been known.

The communication relay MCU 25 and the position control part 30 are connected with each other through a network 27 which is provided for each communication relay MCU 25. The communication relay MCU 25 is connected with a maximum of two position control parts 30 for each network 27. The network 27 performs communication by a protocol peculiar to the position control part 30. In the robot controller 10 shown in FIG. 1, communication between the plural axes position command creation part 20 and each of the position control parts 30 is performed through the communication relay MCU 25 which is provided with a microprocessor or the like. Therefore, when the communication relay MCU 25 is provided with a protocol conversion function, the communication relay MCU 25 is capable of coping with various communication protocols of the plural axes position command creation part 20 regardless of a type of the communication protocol of the position control part 30. In other words, in a case that the plural axes position command creation part 20 is provided as a host apparatus which collectively supervises a plurality of robots 50, various types of robot controllers 10 can be connected with the plural axes position command creation part 20 by replacing the communication relay MCU 25 or selecting software executed in the communication relay MCU 25. In this embodiment, the communication relay MCU 25 is configured to detect an abnormal condition of communication between the plural axes position command creation part 20 and the communication relay MCU 25 and, based on the detected result, the communication relay MCU 25 transmits a signal indicating a communication effective state to each of the position control parts 30.

Figure 2:
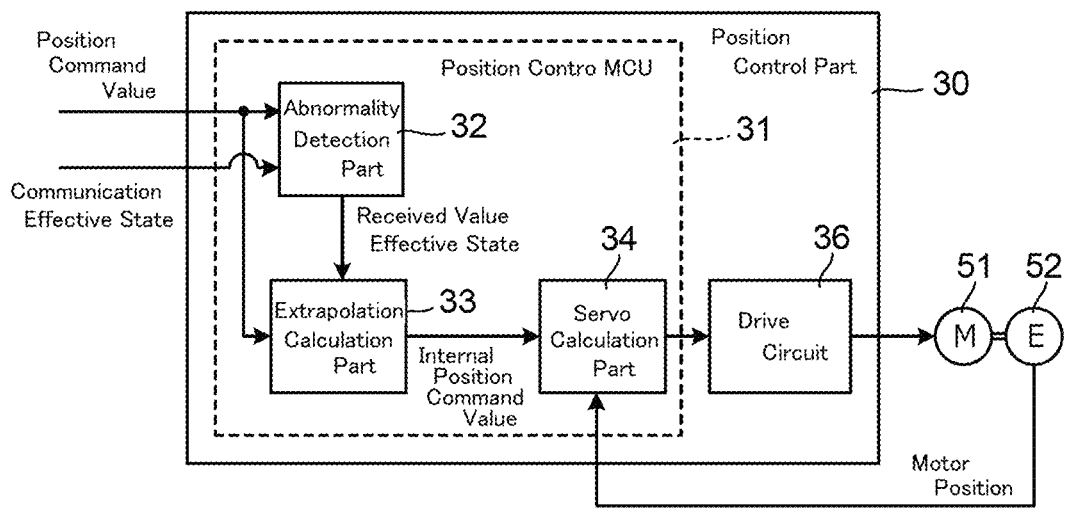
FIG. 2 is a block diagram showing an example of a configuration of a position control part.

FIG. 2 shows a configuration of the position control part 30. The position control part 30 is configured to control the motor 51 of its corresponding axis based on a position command which is transmitted from the plural axes position command creation part 20. For example, the position control part 30 includes a position control MCU (microcontroller unit) 31 structured of a microprocessor and a drive circuit 36 which drives the motor 51 which is a three-phase motor. The drive circuit 36 includes an inverter circuit. The position control MCU 31 includes, as a logical configuration, an abnormality detection part 32 which detects presence or absence of occurrence of communication abnormality by applying a technique such as an error detecting code to the received position command value, an extrapolation calculation part 33 which receives the position command value and performs extrapolation processing when necessary to create an internal position command value, and a servo calculation part 34 to which a rotation position of the motor 51 is fed back from an encoder 52 connected with the motor 51 and in which calculation for servo-control is performed based on the internal position command value and the rotation position having been fed back to control the drive circuit 36 based on the calculation result. The abnormality detection part 32 is also inputted with a signal indicating a communication effective state from the communication relay MCU 25. The abnormality detection part 32 determines whether data having been received as a position command value are valid or not in every updating period as described below and transmits a received value effective state signal to the extrapolation calculation part 33. The received value effective state signal becomes a value indicating "normal" when the position command value is normally received and, when the position command value is not received or when communication abnormality is detected, the received value effective state signal becomes a value indicating "abnormality". Also when a communication effective state signal which is received from the communication relay MCU 25 indicates that communication between the plural axes position command creation part 20 and the communication relay MCU 25 is "invalid", the abnormality detection part 32 outputs a received value effective state signal indicating "invalidity". In a case that the received value effective state is "normal", the extrapolation calculation part 33 transfers an inputted position command value to the servo calculation part 34 as it is as an internal position command value and, in a case that the received value effective state is "abnormal", a result of extrapolation calculation is transferred to the servo calculation part 34 as an internal position command value.

Figure 3:
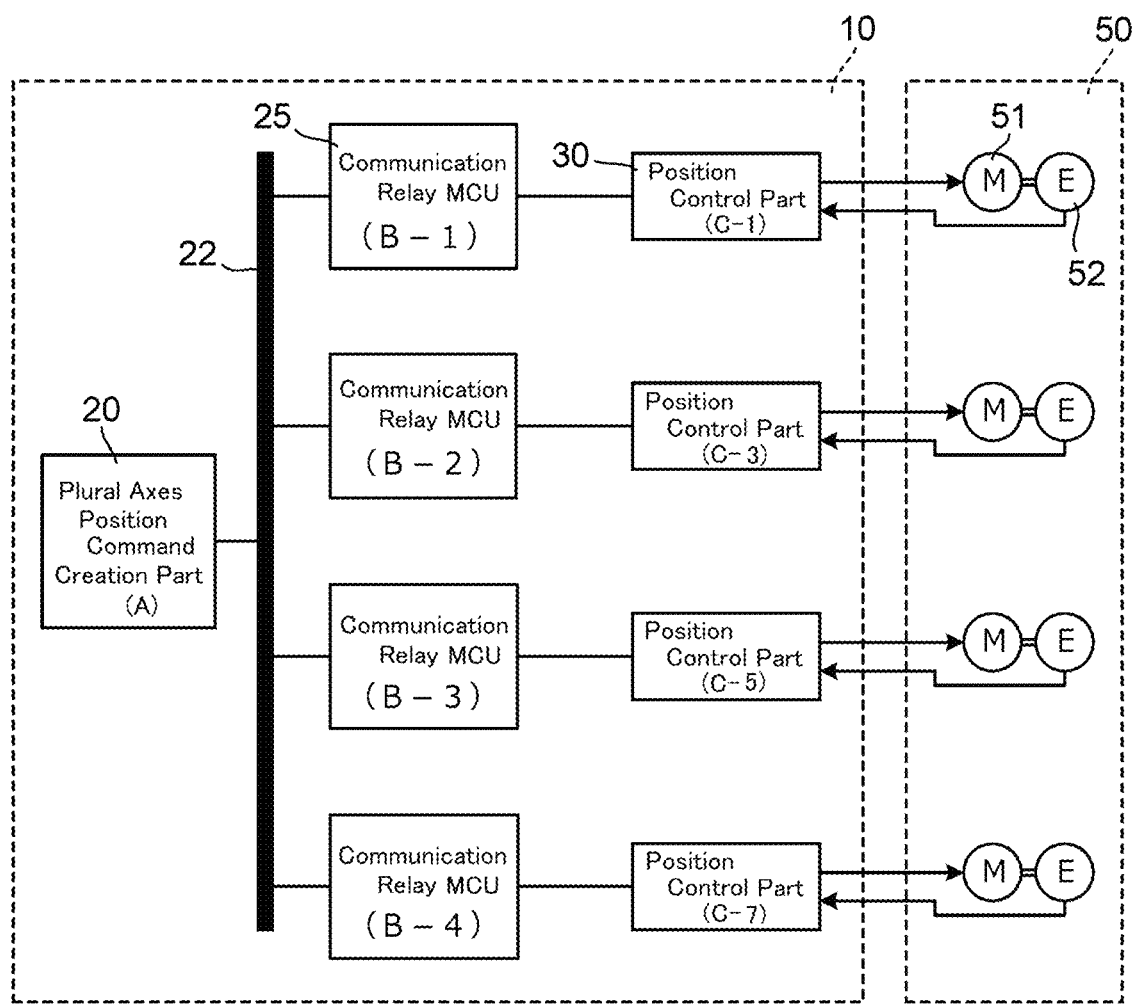
FIG. 3 is a view showing another example of a configuration of a robot controller.

In the robot controller 10 shown in FIG. 1, processing loads in the plural axes position command creation part 20 and the communication relay MCU 25 vary according to a number of the axes of the robot 50, in other words, a number of the position control parts 30, and a processing load becomes heavy when a number of axes increases. Each of the position control parts 30 is configured to take a position command value with, for example, 250 μs as an update period (sampling period). Ideally, it is desired that a position command value is transmitted to each of the position control parts 30 in an update period of the position command value in the position control part 30. However, when processing loads in the plural axes position command creation part 20 and the communication relay MCU 25 are heavy, a position command value is unable to be created in an update period in the position control part 30 and is unable to be transmitted to the position control part 30 and thus, a transmission period of a position command value becomes longer. For example, as shown in FIG. 3, when one position control part 30 is connected with one communication relay MCU 25, the communication relay MCU 25 is capable of transmitting a position command value to the position control part 30 in a period of 250 μs. However, as shown in FIG. 1, when two position control parts 30 are connected with one communication relay MCU 25, the communication relay MCU 25 transmits a position command value to each of the position control parts 30 in a period of 500 μs.

Figure 4:
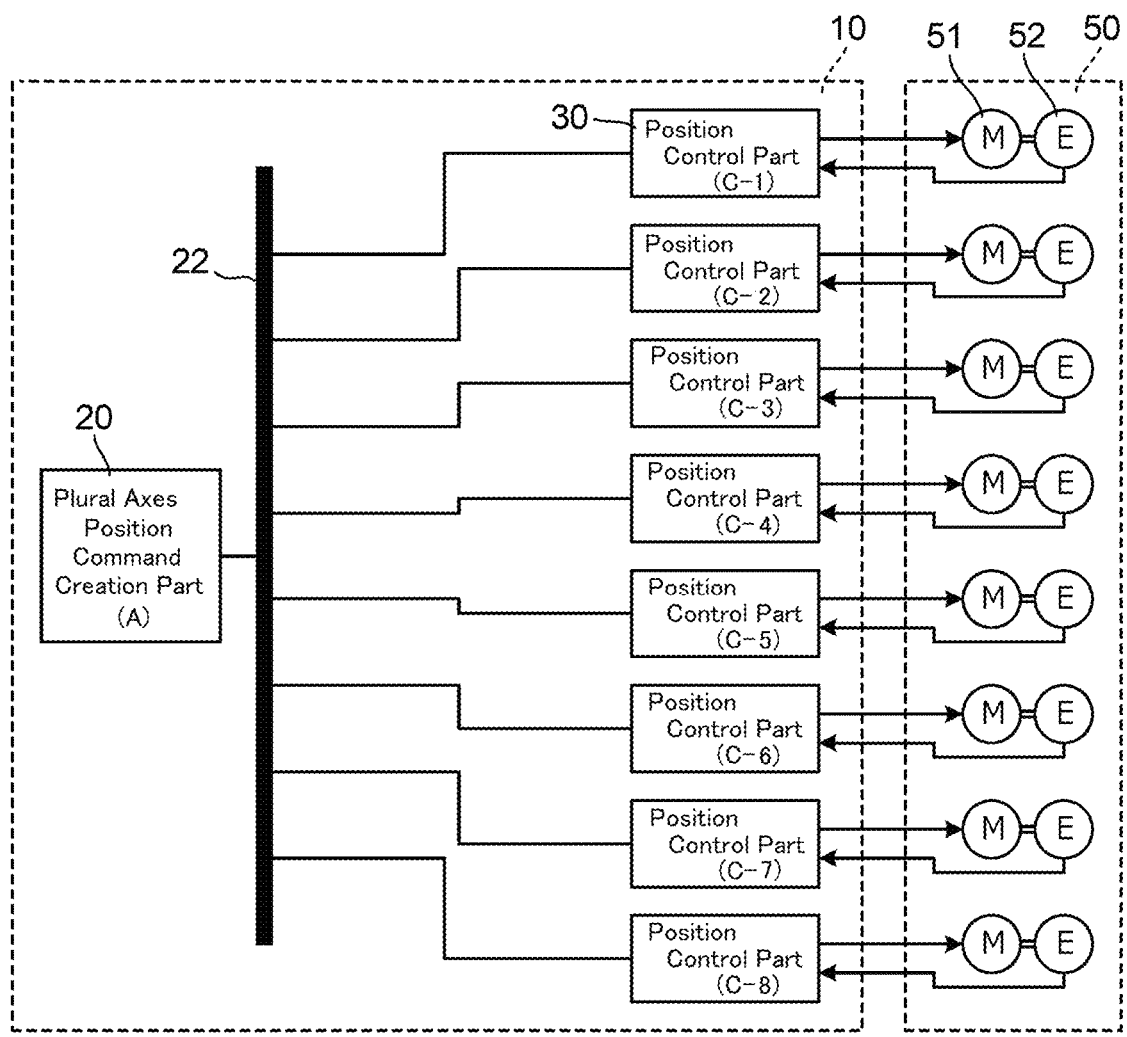
FIG. 4 is a view showing another example of a configuration of a robot controller.
Figure 5:
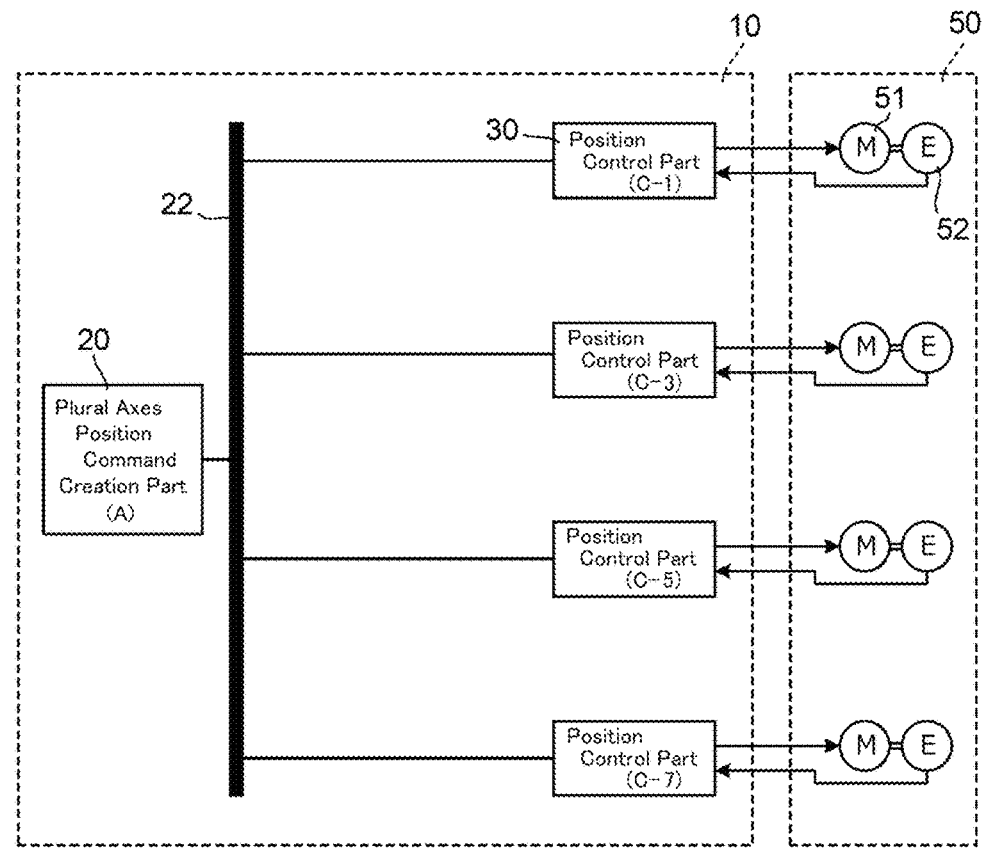
FIG. 5 is a view showing another example of a configuration of a robot controller.

Also in the plural axes position command creation part 20, similarly, a transmission period of a position command value is changed according to a number of position control parts 30 which are connected with the plural axes position command creation part 20 directly or through the communication relay MCU 25. FIG. 4 shows a robot controller 10 in which eight position control parts 30 are connected with the plural axes position command creation part through a network 22 without using the communication relay MCU 25. FIG. 5 is a robot controller 10 similar to that in FIG. 4 but is a robot controller 10 in which a number of position control parts 30 connected with the plural axes position command creation part 20 is four. In the case shown in FIG. 5, the plural axes position command creation part 20 is capable of transmitting a position command value to each of the position control parts 30 in an update period (for example, 250 μs) of the position control part 30. On the other hand, in the case shown in FIG. 4, a number of position control parts 30 is large and a calculation load in the plural axes position command creation part 20 becomes large and thus, a position command value can be transmitted from the plural axes position command creation part 20 to each of the position control parts 30 only in a period longer than an update period of the position control part 30 (for example, 500 μs).

In the position control part 30, if a position command value does not exist in the position control part 30 at every update period, the corresponding motor 51 cannot be servo-controlled. Therefore, when a position command value is capable of being received only in a period longer than an update period of the position control part 30, a position command value which is to be used in the update period when the position command value is not received is required to be calculated based on a position command value having been already received. This is an extrapolation calculation which is executed by the extrapolation calculation part 33. Actually, it is common that a transmission period of a position command value to the position control part 30 is set to be an integral multiple of an update period of a position command in the position control part and, in the update period which has not received a position command value, the previously received position command value is used.

Also in a case that a position command value is not received due to communication abnormality or the like at a timing when a position command value is to be received and the position command value is missing, the extrapolation calculation is similarly executed in the extrapolation calculation part 33. However, in a case that a position command value which is to be received is missing due to communication abnormality or the like, when the position command value having been previously received is used as it is, it may occur that the motor 51 is servo-controlled by a position command value largely separated from a position command value which is originally to be received and thereby, abnormal noise or vibration may be generated in the robot 50. In order to prevent this problem, at least an embodiment of the present invention provide an extrapolation method which is capable of preventing abnormal noise and vibration.

Figure 6:
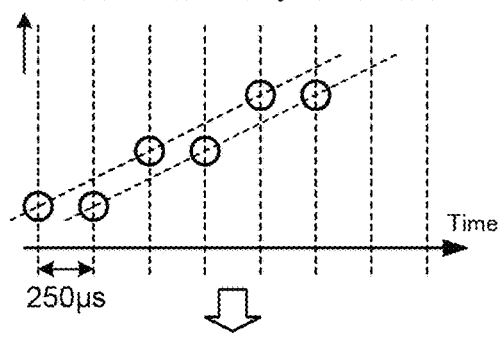
FIG. 6 is a view showing a relationship between position command values and two-period retreat difference values.
Figure 6:
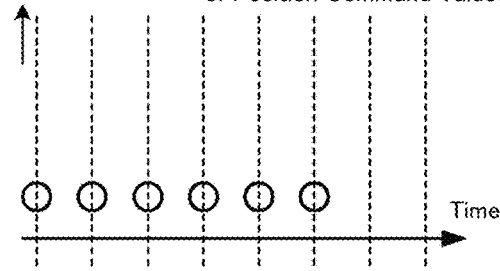

FIG. 6 shows position command values, which are originally to be transmitted to the position control parts 30 by the communication relay MCU 25 in the robot controller 10 described with reference to FIG. 1 when an update period of the position control part 30 is, for example, 250 μs, and two-period retreat difference values of the position command values. In FIG. 6, a horizontal axis indicates time and a vertical axis indicates a position command value or a two-period retreat difference value. A vertical line shown by a broken line indicates a timing when a position command value is to be taken by the position control part 30 for each update period, in other words, to be sampled. In this embodiment, the plural axes position command creation part 20 of the robot controller 10 shown in FIG. 1 creates position command values for all axes of the robot 50, in other words, for eight axes and thus, a position command value to the position control part 30 of interest is created for each two update periods (for example, 500 μs) in the position control part 30. In the example shown in FIG. 6, the motor 51 is rotated at an equal speed, and position command values are increased by a constant increasing amount for each two update periods. In this case, the two-period retreat difference value is not changed. A state that a sudden change occurs in the two-period retreat difference value is a time when the robot 50 does not move smoothly and thus, abnormal noise and vibration may occur in the robot 50.

A position command value in a certain updating period "t", which is a "t"-th updating period counted from a certain reference time point is expressed as y(t). In a case that original position command values are to be changed as shown in FIG. 6, FIGS. 7A and 7B show behaviors of position command values and two-period retreat difference values when a position command value is not normally received and a position command value y(k) in an updating period "k" is extrapolated with a position command value y(k−1) in a preceding updating period "k-1" precedent by one. In other words, the extrapolation calculation in this case is shown by the following expression (1).

$$y(k)=y(k-1) \tag{1}$$

In FIG. 7A, a clear circle shown by a solid line indicates a position command value which has been normally received, and a clear circle shown by a broken line indicates a position command value which has not been received due to abnormality. Presence or absence of the abnormality can be, for example, known by performing error detection with respect to communication data. Further, circles with hatching indicate a position command value, which is obtained by extrapolation calculation when there is a position command value which is unable to be received due to abnormality, and a two-period retreat difference value obtained by the extrapolation calculation. As shown in FIG. 7A, in a case that abnormality occurs and extrapolation calculation is performed in an updating period when a position command value is to be increased with respect to the previous update period, a position command value in the position control part 30 is not changed and, as a result, a sudden change occurs in a two-period retreat difference value. In the case shown in FIG. 7A, a sudden change occurs in the two-period retreat difference value and thus, abnormal noise and vibration may occur in the robot 50.

FIG. 7B shows a position command value after extrapolation calculation is performed and its two-period retreat difference value in a case that the position command values are to be changed as shown in FIG. 6 and abnormality occurs at a timing when the same position command value as a position command value in the previous updating period is to be transmitted. The timing when abnormality occurs is a timing when there is no change with respect to a position command value in the previous updating period and thus, when extrapolation calculation is performed according to the expression (1), the same value as a position command value to be originally obtained is provided and, as a result, a sudden change does not occur in a two-period retreat difference value. Therefore, abnormal noise and vibration do not occur in the robot 50. In the case shown in FIG. 7A, a sudden change occurs in a two-period retreat difference value and thus, missing of a position command value due to communication abnormality cannot be adequately coped by the extrapolation calculation according to the expression (1).

FIGS. 8A and 8B show a position command value and a two-period retreat difference value in a case that position command values are changed as shown in FIG. 6 and extrapolation calculation is performed according to the following expression (2).

$$y(k)=y(k-1)+\{y(k-1)-y(k-2)\} \tag{2}$$

FIG. 8A shows a case that abnormality occurs in an updating period when a position command value is to be increased with respect to the previous updating period. In the case shown in FIG. 8A, a position command value obtained by the extrapolation calculation is similar to the case in FIG. 7A and a sudden change occurs in a two-period retreat difference value. FIG. 8B shows a case that abnormality occurs at a timing when the same position command value as a position command value in the previous updating period is to be transmitted. In this case, a position command value which is obtained by extrapolation calculation becomes larger than an original position command value due to the item of {y(k−1)−y(k−2)} in the expression (2). As a result, a sudden change occurs in a two-period retreat difference value. Even in a case that extrapolation calculation is performed according to the expression (2), missing of a position command value due to communication abnormality cannot be adequately coped.

FIGS. 9A and 9B are explanatory views showing extrapolation method in accordance with an embodiment of the present invention. FIGS. 9A and 9B show a position command value and a two-period retreat difference value in a case that position command values are changed as shown in FIG. 6 and extrapolation calculation is performed according to the following expression (3). The expression (3) is an example of a calculation algorithm by an extrapolation method in accordance with the present invention. In this embodiment, a transmission period of a position command value to the position control part 30 is set to be two-times of an updating period of a position command value in the position control part 30.

$$y(k)=y(k-2)+\{y(k-2)-y(k-4)\} \quad (3)$$

FIG. 9A shows a case that abnormality occurs in an updating period when a position command value is to be increased with respect to the previous updating period. FIG. 9B shows a case that abnormality occurs at a timing when the same position command value as a position command value in the previous updating period is to be transmitted. In both cases, a position command value calculated by the extrapolation calculation is an original position command value, and two-period retreat difference values are constant. When a position command value is changed as shown in FIG. 6, extrapolation calculation according to the expression (3) is capable of adequately coping with missing of a position command value due to communication abnormality.

The extrapolation calculation according to the present invention is not limited to the expression (3).

FIGS. 10A and 10B are explanatory views showing extrapolation method in accordance with another embodiment of the present invention. FIGS. 10A and 10B show a position command value and a two-period retreat difference value in a case that position command values are changed as shown in FIG. 6 and extrapolation calculation is performed according to the following expression (4). The expression (4) is another example of a calculation algorithm by an extrapolation method in accordance with the present invention.

$$y(k)=y(k-2)+\{y(k-1)-y(k-3)\} \quad (4)$$

FIG. 10A shows a case that abnormality occurs in an updating period when a position command value is to be increased with respect to the previous updating period. FIG. 10B shows a case that abnormality occurs at a timing when the same position command value as a position command value in the previous updating period is to be transmitted. In both cases, a position command value calculated by the extrapolation calculation is an original position command value, and two-period retreat difference values are constant. When a position command value is changed as shown in FIG. 6, extrapolation calculation according to the expression (4) is capable of adequately coping with missing of a position command value due to communication abnormality.

The examples shown in FIGS. 9A and 9B and FIGS. 10A and 10B are cases that a transmission period of a position command value to the position control part 30 is two-times of an updating period of a position command value in the position control part 30, and extrapolation calculation is required to perform in an updating period when a position command value is not transmitted. On the other hand, in a case that a transmission period of a position command value to the position control part 30 is coincided with an updating period of a position command value in the position control part 30, extrapolation calculation is not required to perform in principle but, in a case that a position command value is not received due to communication trouble or the like, extrapolation calculation is required to perform. Next, extrapolation calculation will be described below in a case that a transmission period of a position command value to the position control part 30 is coincided with an updating period of a position command value in the position control part 30.

Figure 11:
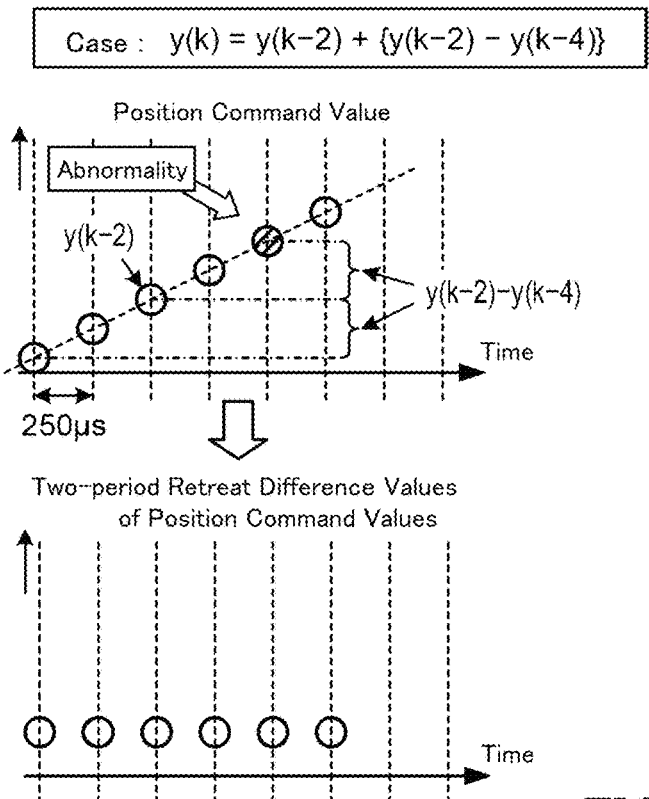
FIG. 11 is a view showing an example of an extrapolation method in accordance with another embodiment of the present invention.
Figure 12:
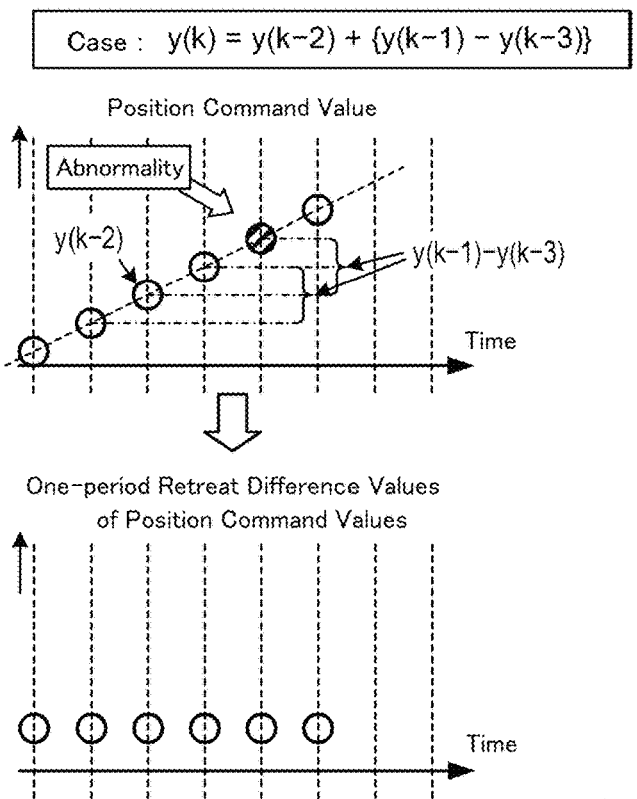
FIG. 12 is a view showing an example of an extrapolation method in accordance with another embodiment of the present invention.

FIG. 11 shows a position command value and a two-period retreat difference value in a case that communication abnormality occurs when a position command value increases by a constant increasing amount for each updating period and extrapolation calculation is performed according to the expression (3). In FIG. 11, a position command value coincided with an original position command value is calculated by the extrapolation calculation and the two-period retreat difference values are also constant. FIG. 12 shows a position command value and a one-period retreat difference value in a case that communication abnormality occurs similarly to the case shown in FIG. 11 and extrapolation calculation is performed according to the expression (4). Also in the case that the expression (4) is used, a position command value coincided with an original position command value is calculated by the extrapolation calculation and the one-period retreat difference values are also constant. As described above, when the motor 51 is to be rotated at an equal speed, even when a transmission period of a position control value is one time or two times of an updating period of a position command value in the position control part 30 and, even when extrapolation calculation is performed according to the expression (3) or the expression (4), extrapolation can be smoothly performed in a case of missing of a position command value due to communication abnormality. There is no difference in performance between the expression (3) and the expression (4).

Figure 13:
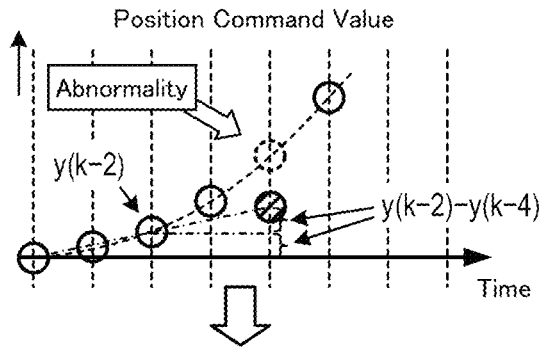
FIG. 13 is a view showing an example of an extrapolation method in accordance with another embodiment of the present invention.
Figure 13:
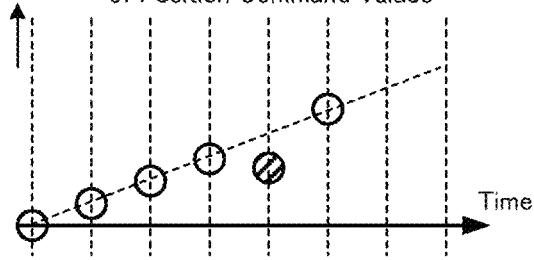
Figure 14:
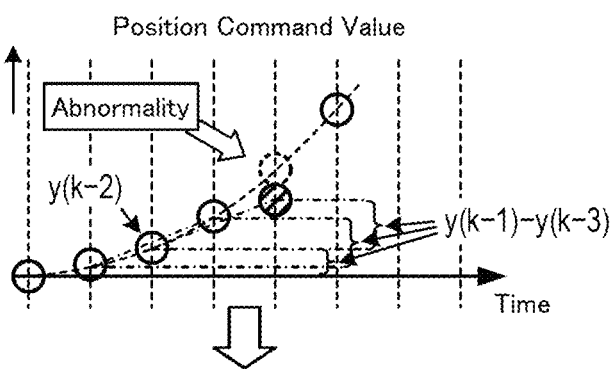
FIG. 14 is a view showing an example of an extrapolation method in accordance with another embodiment of the present invention.
Figure 14:
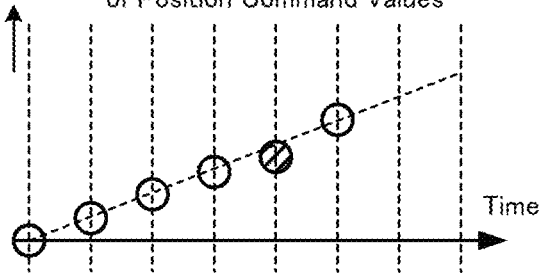

FIG. 11 and FIG. 12 are views showing examples that position command values for rotating the motor 51 at an equal speed are transmitted to the position control part 30. However, communication abnormality may occur when position command values which accelerate or decelerate the motor 51 are transmitted to the position control part 30. Whether the motor 51 is accelerated or decelerated does not essentially influence extrapolation calculation and thus, as an example, position command values which accelerate the motor 51 are transmitted to the position control part 30 in a case that a transmission period of a position command value to the position control part 30 is coincided with an updating period of a position command value in the position control part 30. FIG. 13 shows a position command value and a one-period retreat difference value when extrapolation calculation is performed according to the expression (3). Similarly, FIG. 14 shows a position command value and a one-period retreat difference value when extrapolation calculation is performed according to the expression (4). When accelerating the motor 51, position command values are increased so as to be along a parabola if there is no communication abnormality, and one-period retreat difference values are increased so as to be along a straight line obliquely rising upward to the right side. In a case that the expression (3) is used, at an updating period when abnormality occurs, a position command value after performing extrapolation calculation becomes slightly smaller than a position command value of the just preceding updating period, and a one-period retreat difference value similarly becomes slightly smaller. On the other hand, when the expression (4) is used, in the updating period when abnormality occurs, a position command value after extrapolation calculation is performed is smaller than an original value, but is larger than the value of the just preceding updating period and, as a result, a difference from an original value of a one-period retreat difference value is also small. Both of the extrapolation calculation according to the expression (3) and the extrapolation calculation according to the expression (4) are capable of coping with missing of a position command value due to communication abnormality at a time of acceleration and deceleration of the motor 51. In this case, the extrapolation calculation according to the expression (4) is superior in performance.

Figure 15:
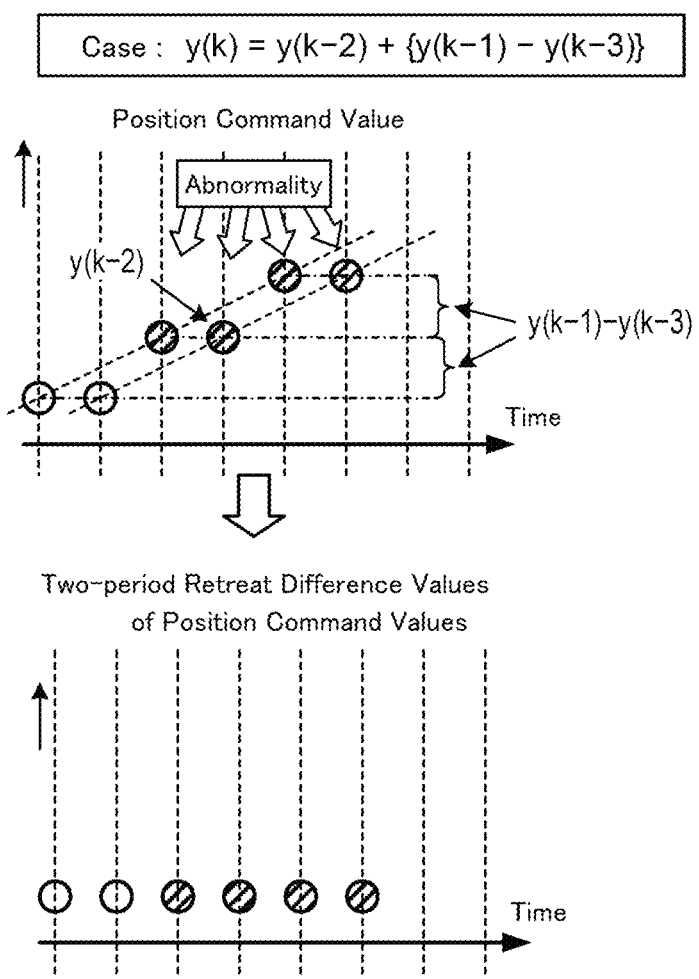
FIG. 15 is a view showing an example of an extrapolation method in accordance with another embodiment of the present invention.

The examples described above are cases that a position command value is missing only in one of a series of updating periods in the position control part 30 due to communication abnormality or the like. The extrapolation method in accordance with the present invention is effective in a case that position command values are missing in continuous updating periods due to communication abnormality or the like when the motor 51 is driven at an equal speed. FIG. 15 shows an example in which position command values are to be changed as shown in FIG. 6, but position command values are missing in continuous four updating periods in the position control part 30 due to communication abnormality or the like. In this case, when extrapolation calculation is performed according to the expression (4), position command values and two-period retreat difference values are obtained as shown in FIG. 15. Position command values used in the extrapolation calculation includes a position command value obtained by preceding extrapolation calculation. As shown in FIG. 15, according to the extrapolation method in accordance with the present invention, position command values of continuous two or more updating periods can be obtained by the extrapolation calculation.

Figure 16A:
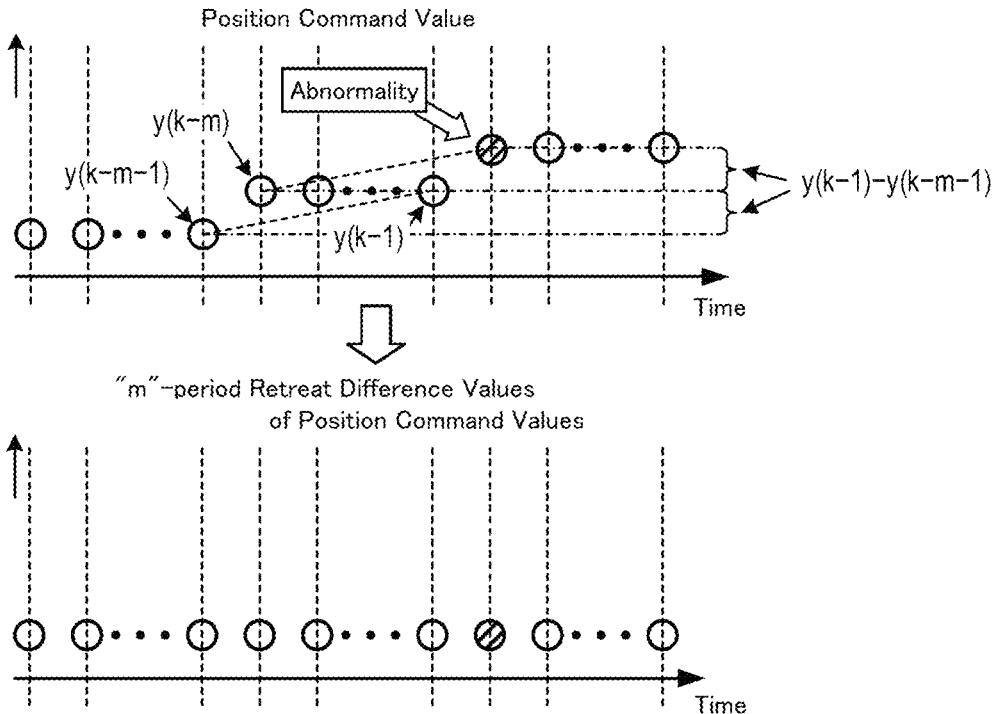
FIGS. 16A and 16B are views showing examples of an extrapolation method in accordance with another embodiment of the present invention.
Figure 16B:
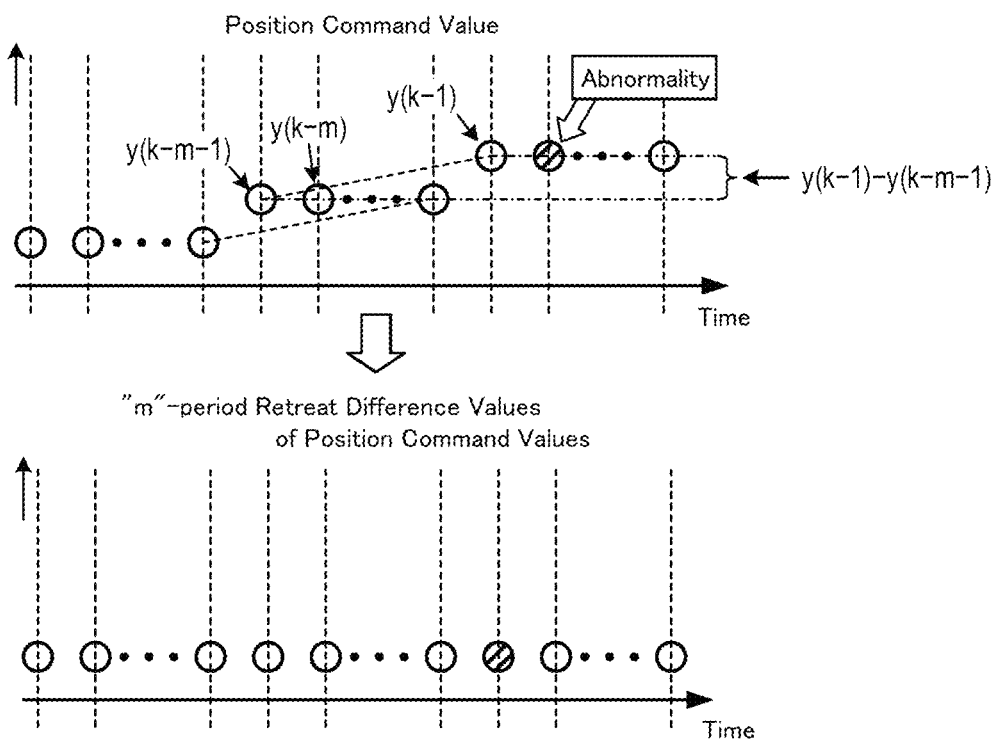

The extrapolation method in accordance with the present invention is effective also in a case that a transmission period of a position command value to the position control part 30 is set to be three times or more of an updating period of a position command value in the position control part 30. Therefore, in a case that a transmission period of a position command value to the position control part 30 is "m" times of an updating period of a position command value in the position control part 30, wherein "m" is an integer of 2 or more, the extrapolation method in accordance with the present invention will be generalized and described below. FIGS. 16A and 16B are explanatory views showing a generalized extrapolation method and show a position command value and its "m"-period retreat difference value when the motor 51 is driven at an equal speed and a generalized extrapolation method is applied. In examples shown in FIGS. 16A and 16B, the following expression (5) is used as an expression of a generalized extrapolation calculation.

$$y(k)=y(k-m)+\{y(k-1)-y(k-m-1)\} \quad (5)$$

When "m"=2, the expression (5) is equal to the expression (4). When a transmission period of a position command value to the position control part 30 is made extremely longer than an updating period in the position control part 30, the robot 50 is unable to be appropriately controlled and thus, it is preferable that "m" is practically set to be not more than four. Since a transmission period of a position command value to the position control part 30 is set to be "m" times in comparison with an updating period in the position control part 30, a position command value is received for each "m" period during an updating period in the position control part 30. In an updating period from a time receiving a position command value to a time receiving the next position command value, a finally received position command value is used as a position command value in the updating period. FIG. 16A shows a case that communication abnormality occurs in an updating period in which a position command value is to be received, and FIG. 16B shows a case that communication abnormality occurs in the next updating period with respect to an updating period in which a position command value is to be received. In both cases, an original position command value is calculated by extrapolation calculation, and "m"-period retreat difference values are also constant. In other words, when extrapolation calculation is performed according to the expression (5), even if a position command value is missing due to communication abnormality, the position command value can be calculated adequately. The extrapolation according to the expression (5) may be used in extrapolation calculation for a sampling timing of a position command value in an updating period of the position control part 30 except a transmission timing of a position command value from a host apparatus.

Figure 17:
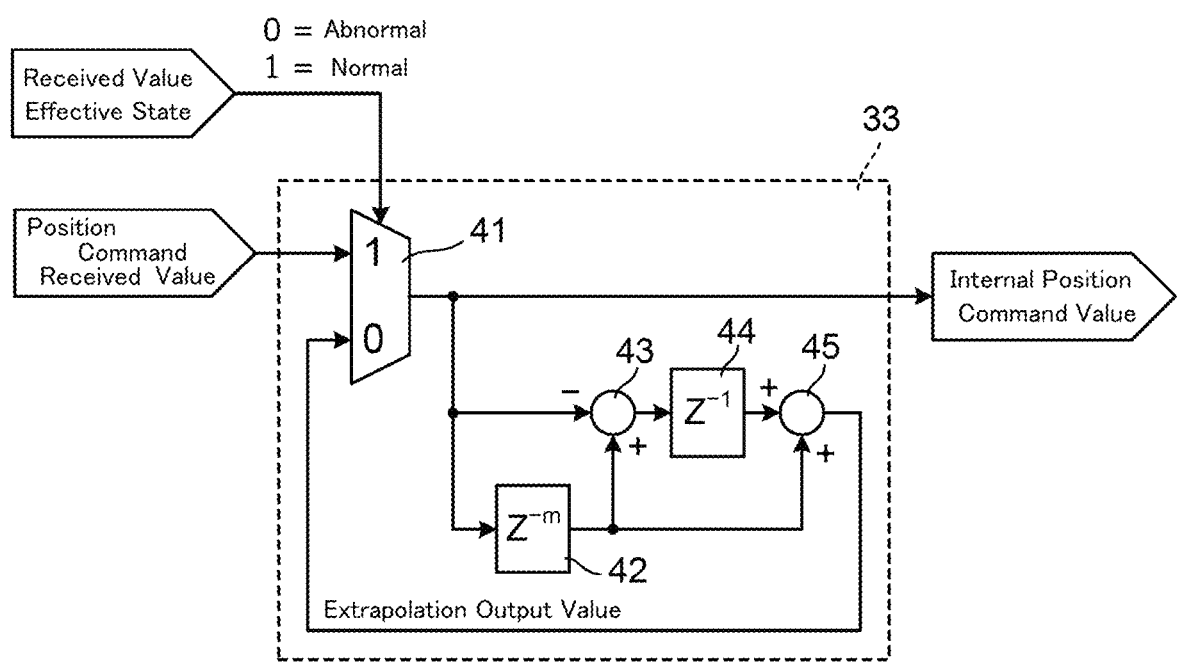
FIG. 17 is a block diagram showing an example of a configuration of an extrapolation calculation part.

FIG. 17 is a view showing a logical configuration of the extrapolation calculation part 33 which is configured to execute extrapolation calculation according to the expression (5) in the position control MCU 31 of the position control part 30. The extrapolation calculation part 33 is provided with a selector 41 which performs a selecting operation based on a received value effective state signal received from the abnormality detection part 32, a delay element 42 which delays the received position command value by "m" updating periods, a subtraction element 43 which subtracts an output of the selector 41 from an output of the delay element 42, a delay element 44 which delays an output of the subtraction element 43 by one updating period, and an addition element 45 in which an output of the delay element 42 and an output of the delay element 44 are added. The received position command value and an output of the addition element 45 are inputted to the selector 41, and an output of the selector 41 is outputted to the servo calculation part 34 as an internal position command value. The selector 41 selects the received position command value when the received value effective state is "valid", and the selector 41 selects the output of the addition element 45 when the received value effective state is "invalid". An output of the addition element 45 is a value obtained by the expression (5) and, as a result, when the received value effective state is "valid", the received position command value is transmitted to the servo calculation part 34 as an internal position command value as it is and, when the received value effective state is "invalid", a result obtained by performing extrapolation calculation according to the expression (5) is transmitted to the servo calculation part 34 as an internal position command value.

In the robot controller described above, when the extrapolation method according to the expression (3), the expression (4), or the expression (5) is used, in a case that a position command value is unable to be received from a host apparatus due to communication abnormality or the like, extrapolation calculation of a position command value is appropriately performed and occurrence of abnormal noise and vibration in the robot 50 can be prevented. In this embodiment, extrapolation of a position command value is described, but extrapolation in accordance with the present invention may be applied to extrapolation of a speed command value.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A controller which controls an apparatus comprising motors each of which drives each axis, the controller comprising a control part which is provided so as to correspond to a motor for each axis and servo-controls the motor based on a command value applied to the motor;
   wherein the control part receives the command value from a host apparatus through communication and updates the command value to be used in a predetermined updating period;
   wherein the command value in a "t"-th updating period which is used in the control part is defined as y(t),
   wherein the control part comprises an extrapolation calculation part which calculates a command value y(k) which is used in a "k"-th updating period according to a following expression when the control part has not received the command value from the host apparatus or abnormality occurs in the communication in the "k"-th updating period:

$y(k)=y(k-2)+\{y(k-1)-y(k-3)\}$, or $y(k)=y(k-2)+\{y(k-2)-y(k-4)\}$.

2. The controller according to claim 1, wherein the control part comprises:
   a servo calculation part to which information regarding a position of the motor is fed back from an encoder connected with the motor to perform calculation required to servo-control; and
   an abnormality detection part which determines whether the command value has been effectively received from the host apparatus or not for each updating period,
   the extrapolation calculation part transfers the command value received from the host apparatus to the servo calculation part when the abnormality detection part determines that the command value has been effectively received, and
   the extrapolation calculation part transfers the command value calculated by the extrapolation calculation part to the servo calculation part when the abnormality detection part does not determine that the command value has been effectively received.

3. The controller according to claim 1, wherein the command value is a position command value.

4. The controller according to claim 1, wherein the host apparatus comprises a plural axes command creation part which collectively calculates and outputs the command values applied to the motors for a plurality of the axes in the apparatus.

5. A controller which controls an apparatus comprising motors each of which drives each axis, the controller comprising a control part which is provided so as to correspond to a motor for each axis and servo-controls the motor based on a command value applied to the motor;
   wherein the control part receives the command value from a host apparatus through communication and updates the command value to be used in a predetermined updating period;
   wherein "m" is an integer of two or more, and a transmission period for transmitting the command value by the host apparatus is "m"-times of a period updating the command value by the control part;
   wherein the command value in a "t"-th updating period which is used in the control part is defined as y(t);
   wherein the control part comprises an extrapolation calculation part which calculates a command value y(k) which is used in a "k"-th updating period according to a following expression when the control part has not received the command value from the host apparatus or abnormality occurs in the communication in the "k"-th updating period:

$y(k)=y(k-m)+\{y(k-1)-y(k-m-1)\}$.

6. The controller according to claim 5, wherein the control part comprises:
   a servo calculation part to which information regarding a position of the motor is fed back from an encoder connected with the motor to perform calculation required to servo-control; and
   an abnormality detection part which determines whether the command value has been effectively received from the host apparatus or not for each updating period,
   the extrapolation calculation part transfers the command value received from the host apparatus to the servo calculation part when the abnormality detection part determines that the command value has been effectively received, and
   the extrapolation calculation part transfers the command value calculated by the extrapolation calculation part to the servo calculation part when the abnormality detection part does not determine that the command value has been effectively received.

7. The controller according to claim 5, wherein the command value is a position command value.

8. The controller according to claim 5, wherein the host apparatus comprises a plural axes command creation part which collectively calculates and outputs the command values to the motors for a plurality of the axes in the apparatus.

9. An extrapolation method in a controller which receives a command value to a motor for each axis from a host apparatus and updates the command value to be used in a predetermined updating period to servo-control the motor based on the command value, the extrapolation method comprising:
   when the command value in a "t"-th updating period which is used for servo-control is defined as y(t), calculating a command value y(k) which is used in a "k"-th updating period according to a following expression when the command value from the host apparatus is not received or abnormality occurs in the communication in the "k"-th updating period:

$y(k)=y(k-2)+\{y(k-1)-y(k-3)\}$, or $y(k)=y(k-2)+\{y(k-2)-y(k-4)\}$.

10. The extrapolation method according to claim 9, wherein the command value is a position command value.

11. An extrapolation method in a controller which receives a command value to a motor for each axis from a host apparatus and updates the command value to be used in a predetermined updating period to servo-control the motor based on the command value, the extrapolation method comprising:
    when "m" is an integer of two or more, and a transmission period for transmitting the command value by the host apparatus is "m"-times of the updating period, and the command value in a "t"-th updating period which is used in the control part is defined as y(t), calculating a command value y(k) which is used in a "k"-th updating period according to a following expression when the command value from the host apparatus is not received or abnormality occurs in the communication in the "k"-th updating period:

$y(k)=y(k-m)+\{y(k-1)-y(k-m-1)\}$.

12. The extrapolation method according to claim 11, wherein the command value is a position command value.

\* \* \* \* \*